United States Patent
Castro et al.

(12) 
(10) Patent No.: US 6,880,043 B1
(45) Date of Patent: *Apr. 12, 2005

(54) RANGE-BASED CACHE CONTROL SYSTEM AND METHOD

(75) Inventors: Ralph H. Castro, Lake Forest, CA (US); Virgil V. Wilkins, Perris, CA (US); Tsun Y. Ng, Orange, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/627,512

(22) Filed: Jul. 25, 2003

Related U.S. Application Data

(63) Continuation of application No. 09/552,399, filed on Apr. 19, 2000, now Pat. No. 6,601,137.

(51) Int. Cl.[7] .............................................. G06F 12/00
(52) U.S. Cl. ........................ 711/113; 711/118; 711/200; 707/200
(58) Field of Search ................................ 711/113, 118, 711/202, 170, 154, 206, 133; 365/49, 50; 707/200

(56) References Cited

U.S. PATENT DOCUMENTS

| | | | | |
|---|---|---|---|---|
| 5,561,786 A | * | 10/1996 | Morse | 711/170 |
| 5,875,352 A | * | 2/1999 | Gentry et al. | 710/23 |
| 6,018,789 A | * | 1/2000 | Sokolov et al. | 711/113 |
| 6,601,137 B1 | * | 7/2003 | Castro et al. | 711/113 |

* cited by examiner

Primary Examiner—Donald Sparks
Assistant Examiner—Brian R. Peugh
(74) Attorney, Agent, or Firm—Milad G. Shara, Esq.; Robroy R. Fawcett, Esq.

(57) ABSTRACT

The present invention relates to disk drive having a cache control system that generates scan results that permit response to a host command using existing cached data having a logical block address (LBA) range that overlaps a host command LBA range. The cache control system forms variable length segments of memory clusters in a cache memory for caching disk data in contiguous LBA ranges. The cached LBA ranges are scanned for segments having LBA ranges overlapping with an LBA range of a host command. The cache control system is effective in exploiting any existing overlapping cache data.

18 Claims, 5 Drawing Sheets

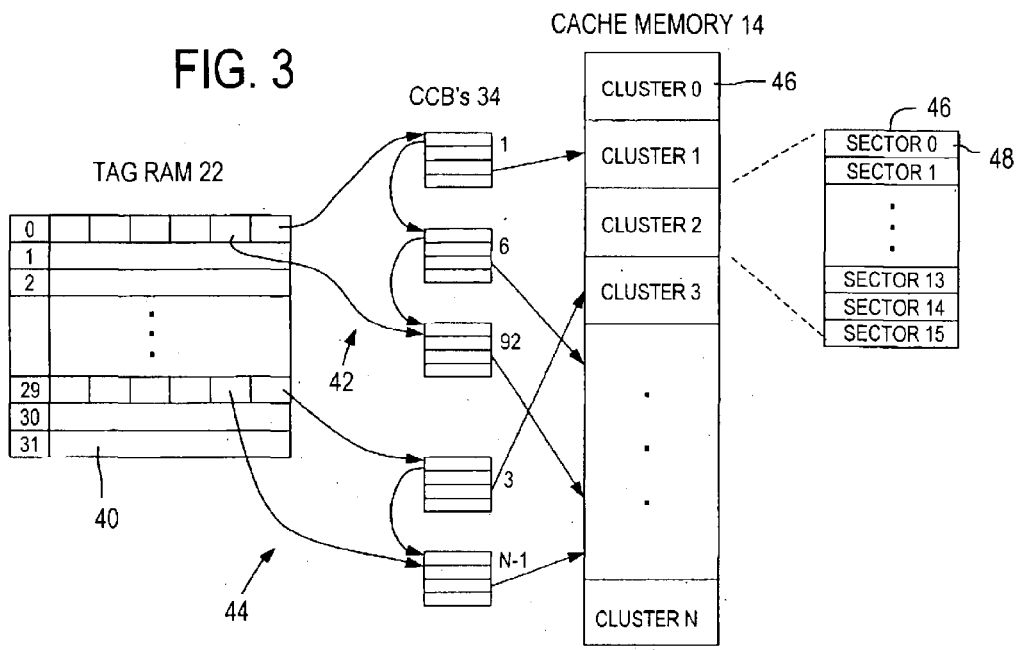
FIG. 3
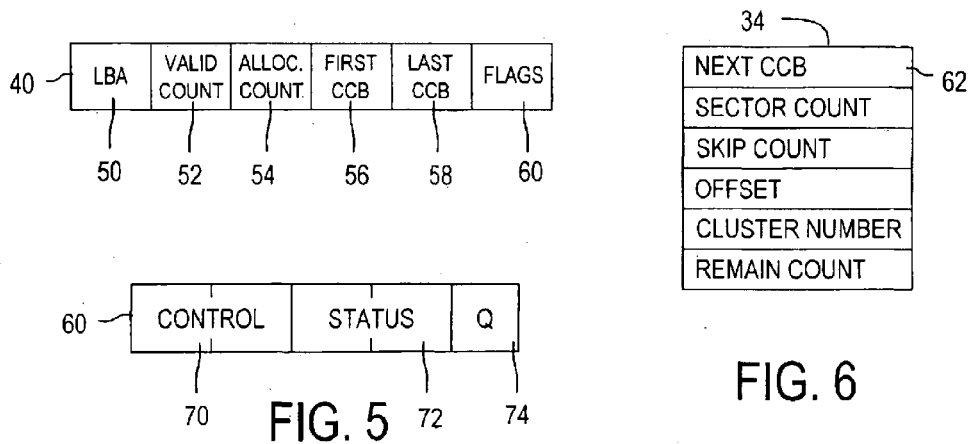
FIG. 4
FIG. 5
FIG. 6

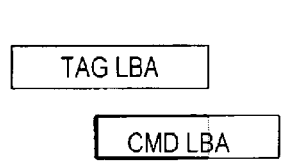
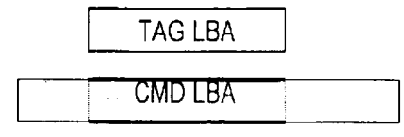
FIG. 12  FIG. 13
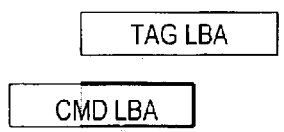
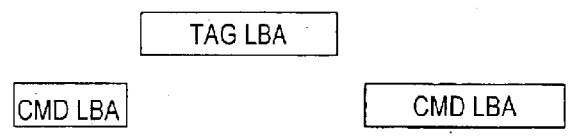
FIG. 14  FIG. 15
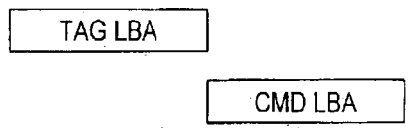
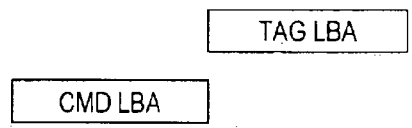
FIG. 16  FIG. 17
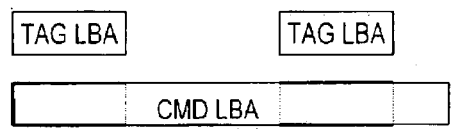
FIG. 18

RANGE-BASED CACHE CONTROL SYSTEM AND METHOD

This application is a continuation of application Ser. No. 09/552,399, filed Apr. 19, 2000, U.S. Pat. No. 6,601,137, herein incorporated by reference.

BACKGROUND OF THE INVENTION

1. Field of the Invention

The present invention relates to disk drive performance features and more particularly to a disk drive having a cache control system for improving the disk drive's response to host commands.

2. Description of the Prior Art

A host computer stores and accesses data on a disk drive by issuing commands to the disk drive over a standardized interface. The smallest indivisible data unit addressable on a disk is a logical block or disk sector, typically of 512 bytes, and each such disk sector is assigned a logical block address (LBA). When the host computer sends a command to the disk drive, the nature of the command is specified, e.g., read or write, along with a start LBA and a count specifying the number of contiguous sectors to be transferred.

Existing disk drives typically have a semiconductor cache memory for temporarily storing disk data that is likely to be requested by a host computer. The response time latency for storing and accessing data in a semiconductor memory is much smaller than the response time latency for mechanically storing and accessing data stored on a rotating disk. In existing disk drives, if an entire LBA range of a host command is not found, or if the first LBA of the host command is not buried within a segment or range of LBA's stored in the cache memory, then a new cache segment is configured for responding to the host command. Accordingly, although the LBA range of the host command may overlap with the LBA range of a segment of the cache memory, that segment is essentially useless in responding to the host command.

Accordingly, there exists a need for a disk drive having a cache memory that may be configured to advantageously use existing cached data to respond to a host command. The present invention satisfies these needs.

SUMMARY OF THE INVENTION

The invention may be embodied in a disk drive, and related method, having a cache memory and a cache control system. The cache memory has a plurality of memory clusters for caching disk data of disk sectors identified by logical block addresses. The cache control system has a tag memory and a scan engine. The tag memory has a plurality of tag records. Each tag record defines a variable length segment of the memory clusters for caching disk data for a range of logical block addresses and indicates the range of logical block addresses. The scan engine is only usable for scanning the tag records. The scan engine includes means for receiving a range of logical block addresses associated with a host command, means for reading the ranges of logical block addresses defined by the tag records, means for comparing the range of logical block addresses associated with the host command with the ranges of logical block addresses indicated in the tag records, and means for providing scan results, based on a comparison by the means for comparing, indicating overlap between the logical block address range associated with the host command and the ranges of logical block addresses indicated in the tag records.

In a more detailed feature of the invention, the means for comparing may further determine whether a first logical block address of a range of logical block addresses associated with a host command is within the ranges of logical block addresses indicated in the tag memory records. The means for providing scan results may indicate the tag records, determined by the means for comparing, having a range including the first logical block address. The means for providing scan results may indicate whether an entire logical block address range, a portion of the logical block address range, or none of the logical block address range associated with a host command is within the ranges of logical block addresses in the tag memory records. The means for providing scan results also may indicate whether the logical block address range associated with a host command is buried within a range of the ranges of logical block addresses in the tag records or whether only a portion of the logical block address range associated with a host command is within a range of the ranges of logical block addresses in the tag memory records. Further, the means for providing scan results may indicate whether the portion includes the beginning or the end of the logical address range associated with the host command.

In another more detailed feature of the invention, the scan engine may accept a scan command, associated with a host command, from a microprocessor, a host writable control store and a host command decoder. The scan engine may include means for arbitrating between scan commands from the microprocessor, the host writable control store and the host command decoder.

BRIEF DESCRIPTION OF THE DRAWINGS

The accompanying drawings illustrate embodiments of the present invention and, together with the description, serve to explain the principles of the invention.

FIG. 3 is a block diagram showing a table of tag records in the tag memory of the cache control system of FIG. 1, for defining segments of memory clusters for caching ranges of disk data.

FIG. 4 is a data structure for a tag record in the table of tag memory records of FIG. 3.

FIG. 5 is a data structure for a status and control flag in the data structure of FIG. 4.

FIG. 6 is a data structure for a cluster control block for use by the tag records of FIG. 3.

FIG. 12 is a block diagram of a host command LBA range versus a tag record LBA range, showing a partial cache hit head buried.

FIG. 13 is a block diagram of a host command LBA range versus a tag record LBA range, showing a partial cache hit mid.

FIG. 14 is a block diagram of a host command LBA range versus a tag record LBA range, showing a partial cache hit tail.

FIG. 15 is a block diagram of a host command LBA range versus a tag record LBA range, showing a cache miss.

FIG. 16 is a block diagram of a host command LBA range versus a tag record LBA range, showing a cache miss sequential head.

FIG. 17 is a block diagram of a host command LBA range versus a tag record LBA range, showing a cache miss sequential tail.

FIG. 18 is a block diagram of a host command LBA range versus tag record LBA ranges, showing multiple cache hits.

DETAILED DESCRIPTION

Figure 1:
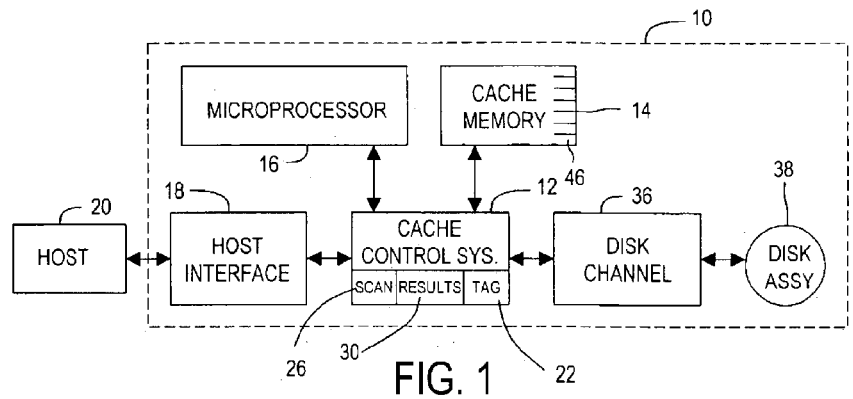
FIG. 1 is a block diagram of a disk drive having a cache control system for scanning a tag memory for overlap between ranges of cached data and a host command range, according to the present invention.

With reference to FIG. 1, a disk drive 10 comprises a cache control system 12, and a cache memory 14 having a plurality of memory clusters 46 for caching disk data stored in sectors (not shown) on disks of a disk assembly 38. Conventionally, the disk sectors are identified by logical block addresses (LBAs). The cache control system comprises a tag memory 22 and a scan engine. The tag memory 22 is embedded in the cache control system 12 and has a plurality of tag records 40 for defining variable length segments of the memory clusters 46 for caching disk data for ranges of LBAs. The scan engine 26 is also embedded within the cache control system 12 and thereby configured only for use in scanning tag records 40. The scan engine 26 includes a comparator for comparing a host command range with the tag record LBA ranges in indicate overlap between the ranges. The cache control system 12 is effective in exploiting existing cached data for LBA ranges overlapping with the host command LBA range.

The disclosures of the following three U.S. patent applications are hereby incorporated by reference: application Ser. No. 09/552,404, filed on Apr. 19, 2000, now U.S. Pat. No. 6,553,457 titled TAG MEMORY DISK CACHE ARCHITECTURE; application Ser. No. 09/552,407, filed on Apr. 19, 2000, titled CLUSTER-BASED CACHE MEMORY ALLOCATION; and application Ser. No. 09/552,402, filed on Apr. 19, 2000, titled CACHE CONTROL SYSTEM AND METHOD HAVING HARDWARE-BASED TAG RECORD ALLOCATION.

With reference again to FIG. 1, the disk drive 10 further includes a microprocessor 16, and a host interface 18. The host interface 18 receives host commands from a host 20, such as a personal computer, and transfers disk data between the disk drive 10 and the host 20. The host commands identify the disk data using a start logical block address (LBA) and a count specifying the number of contiguous sectors to be transferred. The cache memory 14 caches the disk data under the direction of the cache control system 12 and the microprocessor 16. The microprocessor 16 operates under firmware control and manages the operation of the disk drive 10 and assists hardware elements under specific conditions. The cache memory 14 is random access memory, typically 2 megabytes (MB). Generally, the larger the cache memory 14, the better the performance of the disk drive 10 in responding to host commands. The cache control system 12 includes the aforementioned tag (random access) memory (RAM) 22, the aforementioned scan engine 26, and a results register 30.

The disk drive 10 also includes a disk channel 36 and the aforementioned disk assembly 38. The disk assembly 38 includes a hard disk platter that is organized into the disk sectors, typically of 512 bytes plus redundancy bytes for error correction, which are individually addressable using a logical block address (LBA). The disk channel 36 performs conventional encoding and decoding of data written to and read from the disk.

Figure 2:
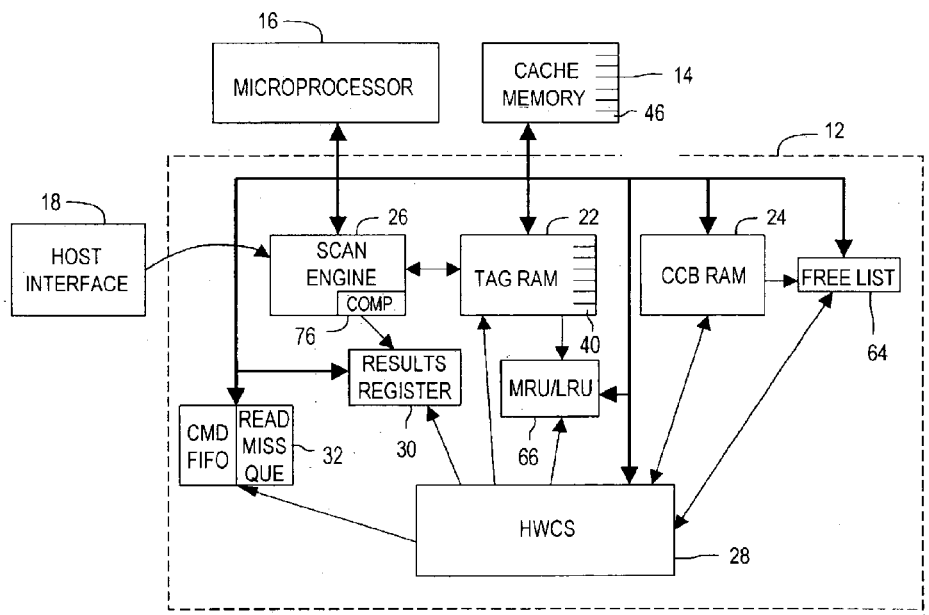
FIG. 2 is a block diagram showing the cache control system of FIG. 1, having the tag memory and a scan engine, according to the present invention.

The cache control system 12 is shown in more detail in FIG. 2. The cache control system 12 includes the tag memory 22, a CCB memory 24, and the scan engine 26. The tag memory 22 is a static random access memory (SRAM) structure, which is preferably embedded in an integrated controller chip, having a table of tag or segment records. The CCB memory 24 is also preferably embedded SRAM having a plurality of records or CCBs (cluster control blocks) 34.

The tag memory 22 may be accessed by the microprocessor 16, the scan engine 26 and a host writable control store (HWCS) 28, and may be updated by the microprocessor 16 and the HWCS 28. The scan engine 26 is coupled to the host interface 18 and receives host commands and scans the tag memory 22 for the LBA ranges associated with a host command. The scan engine 26 places the scan results in a results register 30 or, if servicing the host command further requires intervention by the microprocessor, the HWCS 28 places the command in a command queue 32. The scan engine is described in more detail below. The command queue 32 has a read miss queue and a write command first-in first-out (FIFO) queue. If a host command may be responded to by the cached data referenced in the tag memory 22, then the HWCS 28 manages the response to the host command, otherwise the microprocessor 16 may assist with the response. Thus, the HWCS 28 offloads cache tasks from the microprocessor 16 enabling response to host commands for data already in the cache memory 14 without microprocessor intervention.

The tag memory 22 is described in more detail with reference to FIGS. 3 and 4. The tag memory 22 has a plurality of the tag records 40 that define segments, 42 and 44, of the memory clusters 46 within the cache memory 14. Typically, the tag memory 22 may have 32 or 64 records dedicated to defining variable length segments. Other tag memory records (not shown) may be dedicated to single block transfers for caching small data elements stored within one memory cluster 46 that are repeatedly accessed by the host 20. The cache memory 14 is divided into sectors 48. The cache sectors 48 are bunched into consecutively numbered groups or clusters. Each cluster 46 has a particular cluster number. Preferably, each cluster 46 has 16 cache sectors 48, although the number of sectors 48 in each cluster 46 may be selected based on the size of the cache memory 14, the size of the CCB SRAM 24, and the operational characteristics of the host 20.

The tag memory 22 defines the segments of the cache memory clusters 46 using the CCBs 34. Each tag record 40 has entries or fields (50, 52, 54, 56, 58 and 60), respectively for indicating the first disk LBA assigned to the corresponding segment, the number of valid sectors in the segment, the number of sectors allocated to the segment, the first segment CCB, the last segment CCB, and state and control flags for the segment. As shown in FIG. 6, each CCB has a pointer 62 to a next CCB in a segment or to indicate that the CCB is the last CCB in the segment. Accordingly, a tag record 40 defines a segment by recording the segment's first CCB in the first CCB entry 56. The first CCB 34 has a pointer 62 to the next or second CCB in the segment. The second CCB likewise has a pointer 62 to the next CCB until the last CCB in the segment. The last CCB has an indicator such as a null value that indicates the end of the segment. Two short exemplary segments, 42 and 44, are shown in FIG. 3. The first segment 42 is defined by the tag record number 1 to have three clusters 46. The second segment 44 is defined by the tag record number 29 to have a length of two clusters 46. The tag memory is described in more detail in the above-referenced U.S. application Ser. No. 09/552,404, titled TAG MEMORY DISK CACHE ARCHITECTURE. The tag records for single block transfers have entries, 50 and 60, for only the first LBA and the state and control flags. The cache control system 12 (FIG. 2) also includes a free list 64 and a most-recently-used/least-recently-used (MRU/LRU) engine 66. The free list 64 tracks any CCB's 34 not assigned to a tag record 40. Accordingly, all CCBs 34 are assigned to either a tag record 40 or to the free list 64. The CCBs 34 and the free list 64 is described in more detail in the above-referenced U.S. application Ser. No. 09/552,407, titled CLUSTER-BASED CACHE MEMORY ALLOCATION. The MRU/LRU engine 66 keeps track of the currency of the cached data associated with each tag record 40 in the tag memory and is described in more detail in above-referenced U.S. application Ser. No. 09/552,402, titled CACHE CONTROL SYSTEM AND METHOD HAVING HARDWARE-BASED TAG RECORD ALLOCATION.

The preferred data structure of the entries (FIG. 4) in the tag records 40 is now described. The first entry 50 in a tag record 40 is a 32-bit address representing the first logical block address of the segment being defined by the tag record 40. The next entry 52 in the tag record 40 is a 10 bit valid count representing the number of valid sectors in the segment. The valid count represents the valid data sectors in the cache memory 14. The next entry 54 in the tag record is a 10-bit allocated count representing the number of cache sectors 48 allocated to the segment. The allocated count is generally equal to the valid count upon command completion except when the command is prematurely aborted. The valid count is never greater than the allocated count. The next entry 56 in the tag record 40 is an 8-bit first segment CCB pointer to the first CCB 34 used in the segment. The next entry 58 in the tag record 40 is an 8-bit last segment CCB pointer. The next entry 60 in the tag record 40 is a series of status and control flags for use by the scan engine 26, the microprocessor 16 and the HWCS 28. Among other things, the status and control flags are used for managing tag record allocations and transfers of data between the memory clusters 46 and the host 20, and between the memory clusters 46 and the disk 38.

As shown in FIG. 5, the status and control flag entry 60 includes a 2-bit control flag 70, a 2-bit status flag 72, and a 1-bit Q scan flag 74. The control flag 70 indicates ownership of the tag record 40. Ownership of a tag record may be maintained by the microprocessor 20, the HWCS 28, or the scan engine 26. The status flag 72 indicates the status of the disk data stored in the memory clusters 14 associated with the tag record 40. The status may be free, available, valid, or valid/dirty. The free status indicates that no valid data is associated with the tag record 40. The available status indicates that valid data is associated with the tag record 40, but that the data may be discarded and the tag record 40 reused. The valid status indicates that valid data is stored in the memory clusters 46 of the segment defined by the tag record. The valid/dirty status indicates a segment of memory clusters 46 having valid data that has not been written to the disk 38. All host write data is marked as valid/dirty when it transferred into the cache memory by the HWCS 28. The Q scan flag 74 is used during a review of the tag records 40 by the MRU/LRU engine 66.

Figure 7:
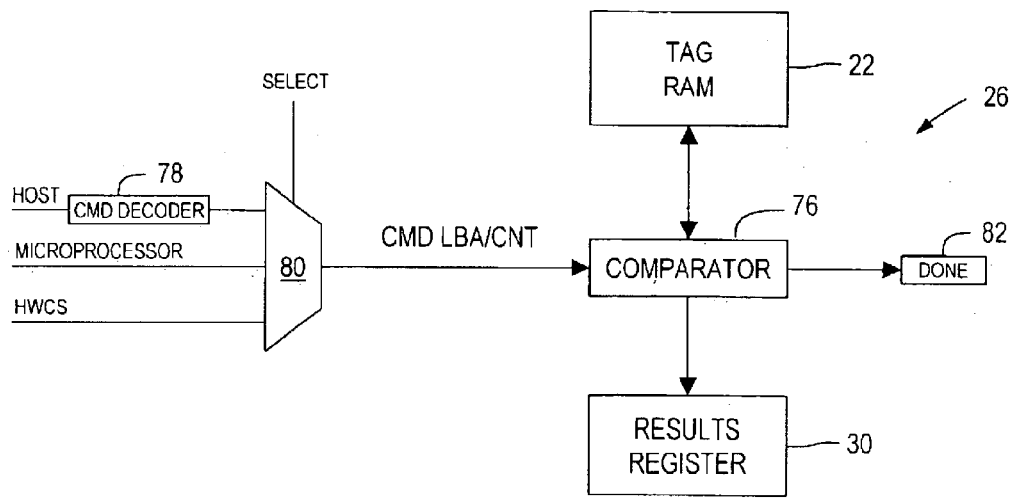
FIG. 7 is a block diagram of the scan engine of the cache control system of FIG. 2.

The scan engine 26 is shown in more detail in FIG. 7. The scan engine includes the aforementioned comparator 76 for comparing an LBA range associated with a host command with LBA ranges in the tag records. A scan of the tag records 40 may be requested by the microprocessor 16, the HWCS 28, or a host command decoder 78. The scan engine 26 receives an LBA range associated with a host command from the command decoder 78, the microprocessor 16, or the HWCS, through a multiplexer 80. The command LBA range is loaded into the comparator 76 and the LBA ranges in the tag records 40 are read into the comparator 76. The comparator 76 compares the LBA ranges and indicates in the results register 30 any overlap or hits between the LBA ranges. The results register 30 indicates (from a scan of all the tag records 40) the type of overlap, the tag record 40 of the overlap, and a bitmap of all the segments that have an overlap.

Figure 8:
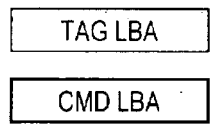
FIG. 8 is a block diagram of a host command logical block address (LBA) range versus a tag record LBA range, showing a full cache hit.
Figure 9:
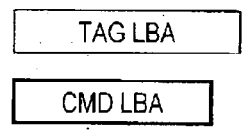
FIG. 9 is a block diagram of a host command LBA range versus a tag record LBA range, also showing a full cache hit.
Figure 10:
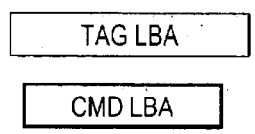
FIG. 10 is a block diagram of a host command LBA range versus a tag record LBA range, showing a fill cache hit buried.
Figure 11:
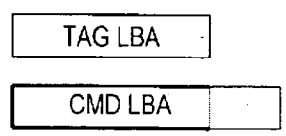
FIG. 11 is a block diagram of a host command LBA range versus a tag record LBA range, showing a partial cache hit head.

The types of overlap in the LBA ranges are defined with reference to FIGS. 8–18 and the logical equations below. The comparison results may include: full cache hit (fhit), full hit buried (fhtb), partial hit head (phth), partial hit head buried (phhb), partial hit mid (phtm), partial hit tail (phtt), cache miss (miss), sequential miss head (seqh), and sequential miss tail (seqt). The start LBA (csa) and the end LBA (cea) of the host command LBA range are compared with the start LBA (tsa) and the end LBA (tea) of the tag records. The comparison results are defined as:

fhit=(csa==tsa) & (cea <=tea) FIGS. 8 & 9 fhtb=(csa>tsa) & (cea <=tea) FIG. 10 phth=(csa==tsa) & (cea>tea) FIG. 11 phhb=(csa>tsa) & (csa<tea) & (cea>tea) FIG. 12 phtm=(csa<tsa) & (cea >=tea) FIG. 13 phtt=(csa<tsa) & (cea>tsa) & (cea<tea) FIG. 14 miss=(csa>tea) or (cea>tsa) FIG. 15 seqh=(csa==tea) FIG. 16 seqt=(cea==tsa) FIG. 17

In FIGS. 8–18, the LBA range overlap is shown highlighted in the host command LBA range. The scan engine 26 may also indicate multiple hits as shown in FIG. 18. The scan engine 26 provides the number of tag record(s) 40 having an LBA range overlap. On a cache miss, the scan engine 26 provides a number for a free tag record 40 for use in responding to the host command. If no free tag records are available, the scan engine 26 may indicate a free tag error.

Only one scan request may be serviced at a time. The highest scan priority is given to requests from the host command decoder 76, next to the HWCS 28, and lowest prior is given to the microprocessor 16. The HWCS 28 and the microprocessor 16 have respective done bits set in a register 82 (FIG. 7) after a requested scan is completed. If the host command decoder 78 requests a scan during a scan by the HWCS 28, the HWCS done bit is not set until the decoder scan is complete so that the decoder scan effectively overrides the HWCS scan. Scan requests by the HWCS 28 during a decoder scan are ignored.

Figure 19:
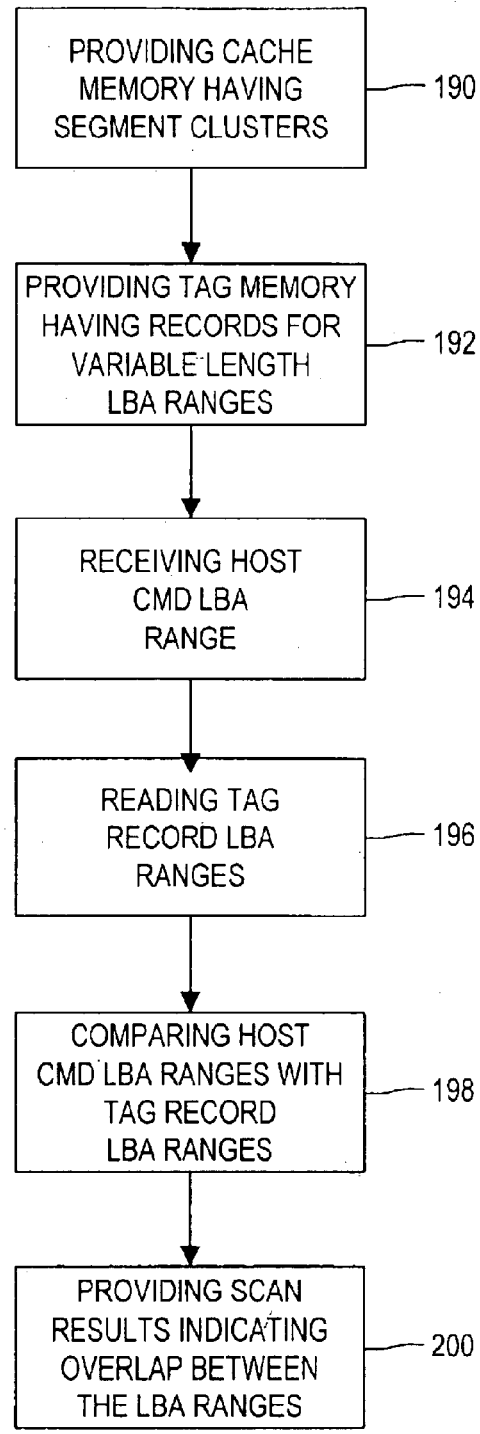
FIG. 19 is a flow chart showing a method for scanning tag records for overlap between a host command range and ranges of cached data.

The present invention also may be embodied in a method, shown in FIG. 19, for servicing host commands using a cache memory 14 having a plurality of memory clusters 46 for caching disk data of disk sectors identified by logical block addresses (step 190). The method includes providing a tag memory 22 having a plurality of tag records 40 (step 192). Each tag record 40 defines a variable length segment of the memory clusters 46 for caching disk data for a range of logical block addresses and indicates the range of logical block addresses. Next, a range of logical block addresses associated with a host command is received (step 194). The ranges of logical block addresses defined by the tag records 40 are read (step 196) and compared (step 198) with the range of logical block addresses associated with the host command. The scan results, based on the comparing step, are provided (step 200) indicating overlap between the logical block address range associated with the host command and the ranges of logical block addresses indicated in the tag records 40.

Accordingly, the cache control system 12 generates scan results that permit response to a host command using existing cached data in an overlapping LBA range. The microprocessor 16 may then set up a tag record 40 for defining a segment of memory clusters 46 to cache the remaining disk data not already in the cache memory 14.

We claim:

1. A disk drive for servicing host commands, comprising:
   cache memory having a plurality of memory clusters for caching disk data of disk sectors identified by logical block addresses; and
   a cache control system including
      a tag memory having a plurality of tag records, each tag record for defining a variable length segment of the memory clusters for caching disk data for a range of logical block addresses and each tag record for indicating the range of logical block addresses,
      a scan engine only usable for scanning the tag records having
         means for receiving a range of logical block addresses associated with a host command,
         means for reading the ranges of logical block addresses defined by the tag records,
         means for comparing the range of logical block addresses associated with the host command with the ranges of logical block addresses indicated in the tag records,
         means for providing scan results, based on a comparison by the means for comparing, indicating overlap between the logical block address range associated with the host command and the ranges of logical block addresses indicated in the tag records.

2. A disk drive as defined in claim 1, wherein the means for comparing further determines whether a first logical block address of a range of logical block addresses associated with a host command is within the ranges of logical block addresses indicated in the tag memory records, and the means for providing scan results indicates the tag records determined by the means for comparing to have a range including the first logical block address.

3. A disk drive as defined in claim 1, wherein the means for providing scan results indicates whether an entire logical block address range, a portion of the logical block address range, or none of the logical block address range associated with a host command is within the ranges of logical block addresses in the tag memory records.

4. A disk drive as defined in claim 1, wherein the means for providing scan results indicates whether the logical block address range associated with a host command is within a range of the ranges of logical block addresses in the tag records such that a start logical block address for the host command is greater than a start logical block address for the overlapping tag record range.

5. A disk drive as defined in claim 1, wherein the means for providing scan results indicates whether only a portion of the logical block address range associated with a host command is within a range of the ranges of logical block addresses in the tag memory records.

6. A disk drive as defined in claim 5, wherein the means for providing scan results indicates whether the portion of the logical block address range associated with a host command that is within a range of the ranges of logical block addresses in the tag records includes the beginning or the end of the logical address range associated with the host command.

7. A cache control system for servicing host commands using a cache memory having a plurality of memory clusters for caching disk data of disk sectors identified by logical block addresses, comprising:
   a tag memory having a plurality of tag records, each tag record for defining a variable length segment of the memory clusters for caching disk data for a range of logical block addresses, and each tag record for indicating the range of logical block addresses; and
   a scan engine only usable for scanning the tag records having
      means for receiving a range of logical block addresses associated with a host command,
      means for reading the ranges of logical block addresses defined by the tag records,
      means for comparing the range of logical block addresses associated with the host command with the ranges of logical block addresses indicated in the tag records,
      means for providing scan results, based on a comparison by the means for comparing, indicating overlap between the logical block address range associated with the host command and the ranges of logical block addresses indicated in the lag records.

8. A cache control system as defined in claim 7, wherein the means for comparing further determines whether a first logical block address of a range of logical block addresses associated with a host command is within the ranges of logical block addresses indicated in the tag memory records, and the means for providing scan results indicates the tag records determined by the means for comparing to have a range including the first logical block address.

9. A cache control system as defined in claim 7, wherein the means for providing scan results indicates whether an entire logical block address range, a portion of the logical block address range, or none of the logical block address range associated with a host command is within the ranges of logical block addresses in the tag memory records.

10. A cache control system as defined in claim 7, wherein the means for providing scan results indicates whether the logical block address range associated with a host command is within a range of the ranges of logical block addresses in the tag records such that a start logical block address for the host command is greater than a start logical block address for the overlapping tag record range.

11. A cache control system as defined in claim 7, wherein the means for providing scan results indicates whether only a portion of the logical block address range associated with a host command is within a range of the ranges of logical block addresses in the tag memory records.

12. A cache control system as defined in claim 7, wherein the means for providing scan results indicates whether the portion of the logical block address range associated with a host command that is within a range of the ranges of logical block addresses in the tag records includes the beginning or the end of the logical address range associated with the host command.

13. A method for servicing host commands using a cache memory having a plurality of memory clusters for caching disk data of disk sectors identified by logical block addresses, comprising:

providing a tag memory having a plurality of tag records, each tag record for defining a variable length segment of the memory clusters for caching disk data for a range of logical block addresses and each tag record for indicating the range of logical block addresses;

receiving a range of logical block addresses associated with a host command;

reading the ranges of logical block addresses defined by the tag records;

comparing the range of logical block addresses associated with the host command with the ranges of logical block addresses indicated in the tag records; and providing scan results based on the comparing step, indicating overlap between the logical block address range associated with the host command and the ranges of logical block addresses indicated in the tag records.

14. A cache method as defined in claim 13, wherein the comparing step further includes determining whether a first logical block address of a range of logical block addresses associated with a host command is within the ranges of logical block addresses indicated in the tag memory records, and step of providing scan results includes indicating the tag records determined by the means for comparing to have a range including the first logical block address.

15. A cache method as defined in claim 13, wherein the step of providing scan results includes indicating whether an entire logical block address range, a portion of the logical block address range, or none of the logical block address range associated with a host command is within the ranges of logical block addresses in the tag memory records.

16. A cache method as defined in claim 13, wherein the step of providing scan results includes indicating whether the logical block address range associated with a host command is within a range of the ranges of logical block addresses in the tag records such that a start logical block address for the host command is greater than a start logical block address for the overlapping tag record range.

17. A cache method as defined in claim 13, wherein the step of providing scan results includes indicating whether only a portion of the logical block address range associated with a host command is within a range of the ranges of logical block addresses in the tag memory records.

18. A cache method as defined in claim 13, wherein the step of providing scan results includes indicating whether the portion of the logical block address range associated with a host command that is within a range of the ranges of logical block addresses in the tag records includes the beginning or the end of the logical address range associated with the host command.

* * * * *